US006970168B2

(12) United States Patent
Emoto et al.

(10) Patent No.: US 6,970,168 B2
(45) Date of Patent: Nov. 29, 2005

(54) ON-BOARD DISPLAY SYSTEM

(75) Inventors: Norishige Emoto, Tokyo (JP);
Kiyoyasu Maruyama, Tokyo (JP);
Tomonori Ohashi, Tokyo (JP);
Kyousuke Yoshimoto, Tokyo (JP);
Tetsuya Sigeeda, Tokyo (JP); Yoichi Masubuchi, Tokyo (JP); Takanori Murakami, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 157 days.

(21) Appl. No.: 10/220,054

(22) PCT Filed: Dec. 27, 2000

(86) PCT No.: PCT/JP00/09318

§ 371 (c)(1),
(2), (4) Date: Aug. 27, 2002

(87) PCT Pub. No.: WO02/056593

PCT Pub. Date: Jul. 18, 2002

(65) Prior Publication Data

US 2003/0023979 A1    Jan. 30, 2003

(51) Int. Cl.$^7$ ............................ G06T 11/20; G09G 5/00
(52) U.S. Cl. ........................................ 345/440; 345/1.1
(58) Field of Search ........................ 345/440, 1.1, 2.1, 345/2.2, 2.3; 725/25

(56) References Cited

U.S. PATENT DOCUMENTS

| 5,053,964 | A |   | 10/1991 | Mister et al. |
| 5,287,186 | A | * | 2/1994 | Takamori ................... 348/705 |
| 5,551,653 | A |   | 9/1996 | Friebe et al. |
| 5,581,246 | A |   | 12/1996 | Yarberry et al. |
| 6,449,768 | B1 | * | 9/2002 | Oftedahl et al. ............ 725/119 |
| 6,591,314 | B1 | * | 7/2003 | Colbath ........................ 710/36 |
| 6,700,602 | B1 | * | 3/2004 | Blair ............................ 348/61 |

FOREIGN PATENT DOCUMENTS

| JP | 06-350535 A | 12/1994 |
| JP | 08-238993 A | 9/1996 |
| JP | 2569025 B2 | 1/1997 |
| JP | 09-148967 A | 6/1997 |
| JP | 11-020697 A | 1/1999 |
| WO | WO 92/19070 A1 | 10/1992 |

* cited by examiner

Primary Examiner—Ryan Yang
(74) Attorney, Agent, or Firm—Birch, Stewart, Kolasch & Birch, LLP

(57) ABSTRACT

A conventional display system carried on a railroad train has the problem that it cannot distribute image signal to the cars of the train when image information output means mounted in a lead car breaks down.

Accordingly, a display system to be carried on a railroad train according to the invention includes: first image information output means provided in a given car in a train of a plurality of connected cars, for outputting first image information; second image information output means provided in a given car of said train, for outputting second image information; and display means provided in a given car of said train, for switchably displaying said first image information transmitted from said first image information output means and said second image information transmitted from said second image information output means.

3 Claims, 11 Drawing Sheets

FIG. 4
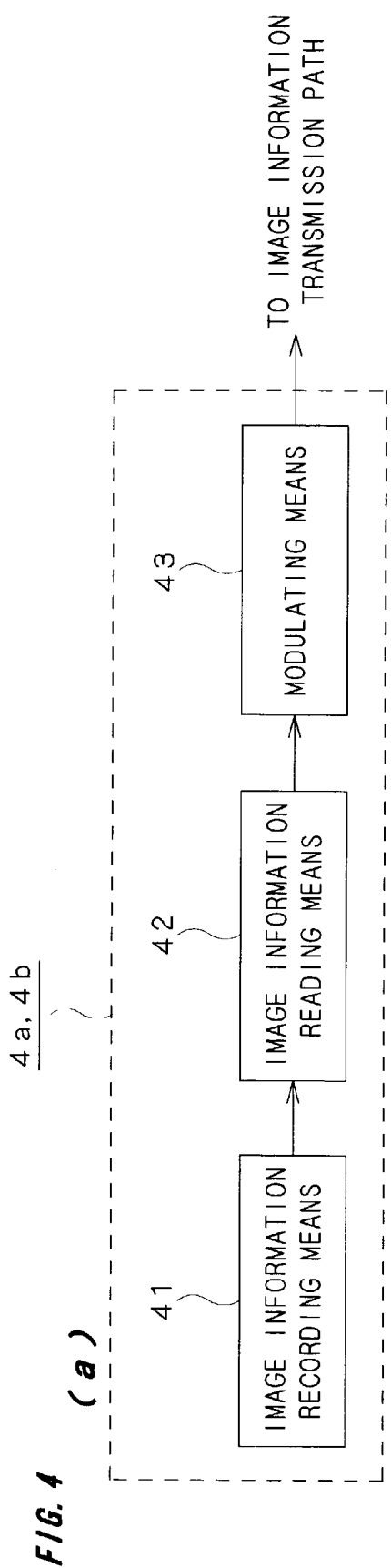
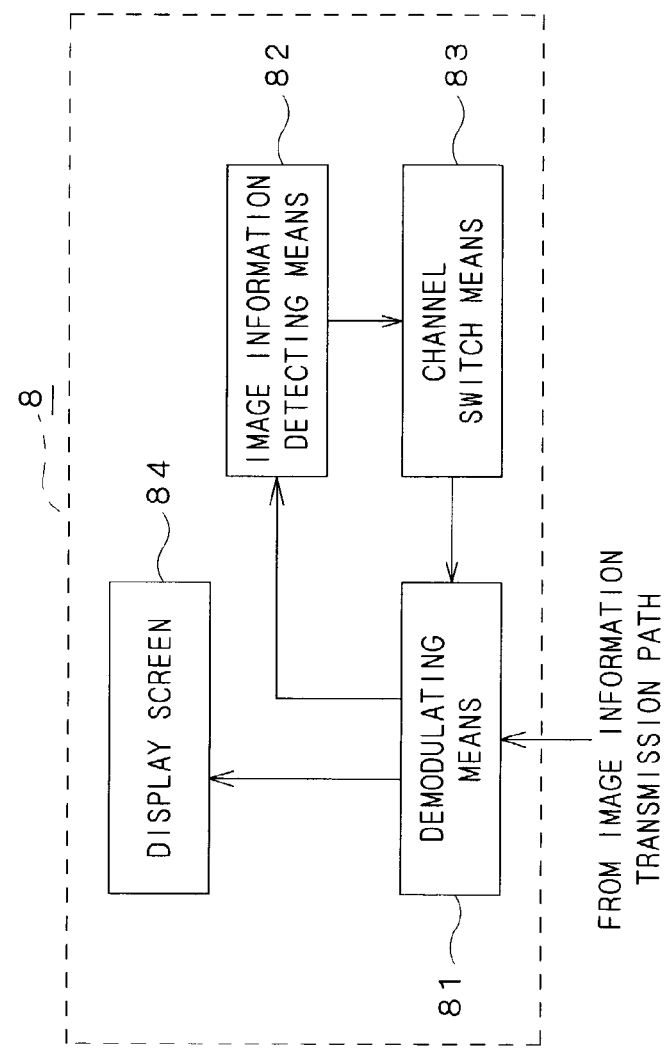

US 6,970,168 B2

ON-BOARD DISPLAY SYSTEM

This application is the national phase under 35 U.S.C. §371 of PCT International Application No. PCT/JP00/09318 which has an International filing date of Dec. 27, 2000, which designated the United States of America.

TECHNICAL FIELD

The present invention relates to a display system that is carried on a railroad train to provide passengers in the passenger cars with various information through images.

BACKGROUND ART

FIG. 11 shows a conventional display system mounted on a railroad train. In the figure, the reference characters 1 and 2 respectively denote first and second lead cars disposed at both ends of the train and 3 denotes intermediate cars coupled between the lead cars 1 and 2. The lead cars 1 and 2 are equipped with a driver's cab and train driving means, though not shown in the figure. The reference character 4a denotes an image information output means mounted in the first lead car 1; 5a denotes a termination means mounted in the second lead car 2; 6a denotes an image information transmission path which has its one end connected to the image information output means 4a, passes through the intermediate cars 3, and is terminated at its other end by the termination means 5a; 7a denotes branch means provided in the first lead car 1, the intermediate cars 3, and the second lead car 2 to branch the image information transmission path 6a; and 8 denotes image display means provided in the passenger section on each car and connected to the image information transmission path 6a branched by the branch means 7a.

Its operation is now described. An image signal outputted from the image information output means 4a is distributed to the individual cars 1 to 3 through the image information transmission path 6a. In each car, the branch means 7a extracts the image signal from the image information transmission path 6a and gives it as input to the image display means 8 to cause it to display the image.

The conventional display system carried on the train is constructed as shown above. However, it has the problem that the image signal cannot be distributed to the individual cars when the image information output means carried on the first lead car breaks down. Particularly, when the image information output means breaks down by an accident such as derailment, fire, etc., it cannot provide passengers with evacuation information through image on the display means.

Furthermore, when a train of connected cars is separated during its journey into two trains bound for different destinations, for example, the train in which the image information output means is absent, i.e. the train containing the second lead car, cannot distribute image information.

The present invention has been made to solve the problems shown above, and an object of the invention is to obtain a display system carried on a railroad train which is less likely to get into conditions in which it cannot distribute image information to the cars. Another object is to obtain a display system carried on a train which, even when one train of connected cars is separated into two trains, can distribute image information in both trains of cars.

DISCLOSURE OF THE INVENTION

According to the present invention, a display system to be carried on a railroad train includes: first image information output means provided in a given car in a train of a plurality of connected cars, for outputting first image information; second image information output means provided in a given car of said train, for outputting second image information; and display means provided in a given car of said train, for switchably displaying said first image information transmitted from said first image information output means and said second image information transmitted from said second image information output means, so that said display means can display image even when one of the first and second image information output means has broken down.

Further, according to the invention, in the display system carried on a railroad train, said first image information output means and said second image information output means are provided in different cars of said train, which reduces the possibility that both the first and second image information output means break down at nearly the same time.

Further, according to the invention, in the display system carried on a railroad train, said first image information output means and said second image information output means output image information for evacuating passengers, so that the safety of passengers can be ensured.

Further, according to the invention, in the display system carried on a railroad train, at least one of said first image information output means and said second image information output means is a hard disk or an optical disk which are susceptible to faults due to vibrations, in which case it is very effective to reduce the possibility that both the first and second image information output means break down at nearly the same time.

Further, according to the invention, in the display system carried on a railroad train, said display means includes first display means provided in a given car, for switchably displaying said first image information and said second image information, and second display means provided in a car different from said car, for switchably displaying said first image information and said second image information, so that the train of cars can be separated into two trains in such a way that each train includes at least one display means so that both trains can distribute image information.

Further, according to the invention, in the display system carried on a railroad train, said first and second image information output means are provided in cars equipped with driving means and disposed at both ends of said train, so that the train of cars can be separated into two trains in such a way that both trains include image information output means.

Further, according to the invention, the display system carried on a railroad train includes: first termination means provided in the car in which said second image information output means is provided; second termination means provided in the car in which said first image information output means is provided; a first image information transmission path having its one end connected to said first image information output means and its other end connected to said first termination means; a second image information transmission path having its one end connected to said second image information output means and its other end connected to said second termination means; first branch means for extracting from said first image information transmission path said first image information outputted from said first image information output means and outputting said first image information to said display means; and second branch means for extracting from said second image information transmission path said second image information outputted from said second image information output means and outputting said second image information to said display means, which structure lessens the restriction of the management of the cars.

Further, according to the invention, the display system carried on a railroad train includes: first termination means provided in the car in which said second image information output means is provided; an image information transmission path having its one end connected to said first image information output means and its other end connected to said first termination means; second termination means provided in a car coupled between the car in which said first image information output means is provided and the car in which said second image information output means is provided; and switching means provided in said car in which said second termination means is provided, for switchably connecting said image information transmission path to said first termination means and to said second termination means, whereby the image information transmission path can be terminated even when the train of cars has been separated into two trains, making it possible to distribute images of good quality.

Further, according to the invention, the display system carried on a railroad train includes: means for detecting that a car coupled to said car in which said second termination means is provided has been separated therefrom; and control means for controlling the switching by said switching means in accordance with a result of the detection, whereby the terminating resistors can be switched automatically when the cars are separated.

Further, according to the invention, the display system carried on a railroad train includes image information detecting means for detecting a halt of transmission of said first image information, wherein when said image information detecting means detects a halt of transmission of said first image information, said display means switches its display from said first image information to said second image information, and thus the images displayed by the display means can be switched automatically.

Further, according to the invention, the display system carried on a railroad train includes: fault detecting means for detecting a fault of said first image information output means; and control means for, when said fault detecting means detects a fault of said first image information output means, controlling said display means to switch the display of said display means from said first image information to said second image information, and thus the image displayed on the display means can be switched automatically.

BRIEF DESCRIPTION OF THE DRAWINGS

FIG. 4 is an explanation diagram that illustrates a channel switching method according to a fourth preferred embodiment.

BEST MODE FOR CARRYING OUT THE INVENTION

First Preferred Embodiment

According to a first preferred embodiment, a display system to be carried on a railroad train has two sets of image information output means and each display means receives image information from both of the image information output means.

Figure 1:
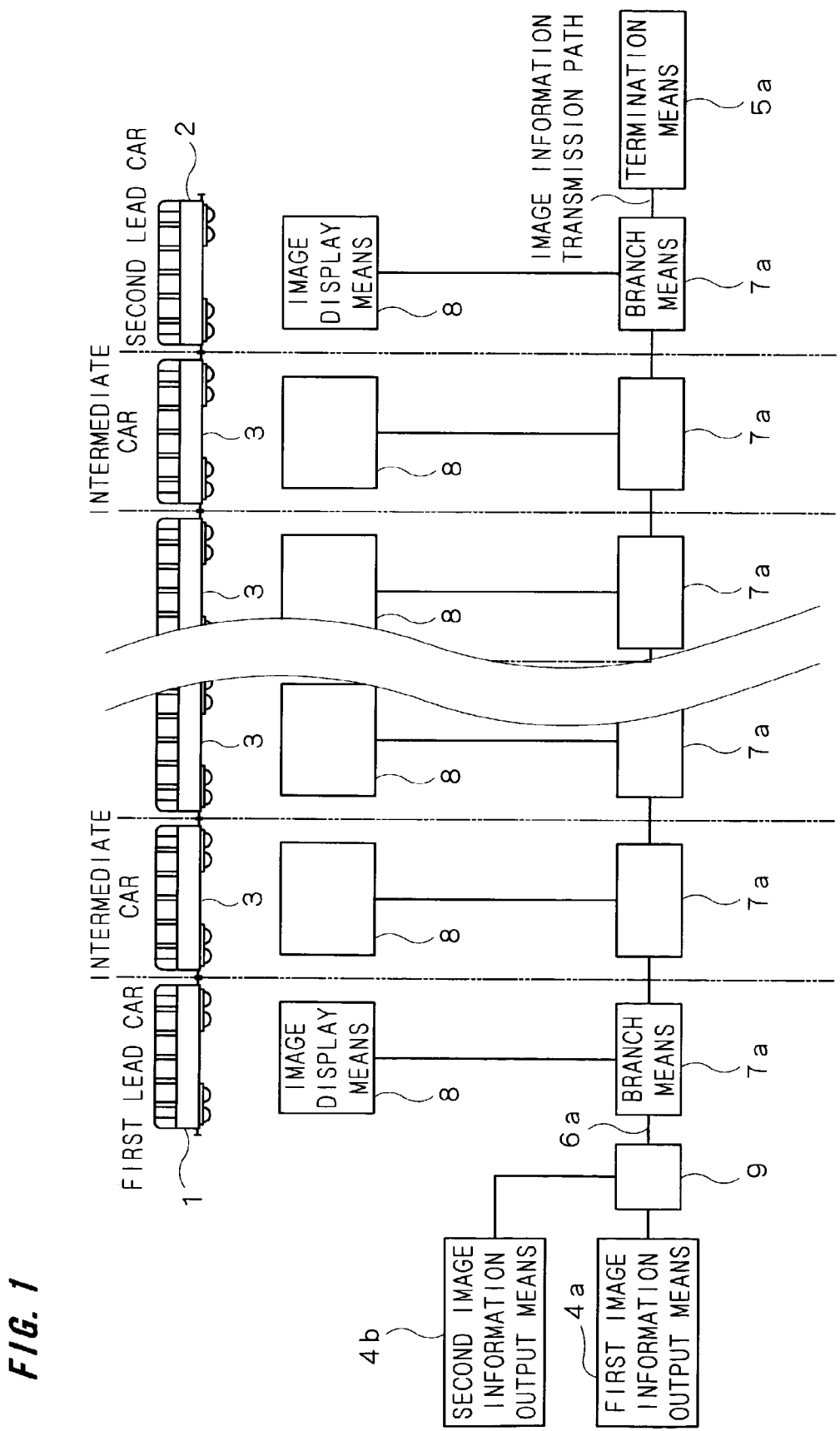
FIG. 1 is a schematic structural diagram that illustrates a display system carried on a train according to a first preferred embodiment.

FIG. 1 is a schematic structural diagram that illustrates a display system carried on a train according to a first preferred embodiment. In the diagram, the parts same as or corresponding to those in the conventional system are shown at the same reference characters and not described again here. In FIG. 1, 4a denotes a first image information output means mounted in the lead car 1 to output a first image signal and 4b denotes a second image information output means also mounted in the lead car 1 to output a second image signal. The first image information output means 4a modulates the first image signal and outputs it onto a first channel and the second image information output means 4b modulates the second image signal and outputs it onto a second channel different from the first channel. The reference character 9 denotes synthesizing means for mixing the first channel and the second channel and provides output onto the image information transmission path 6a.

Its operation is now described. The first image signal outputted from the first image information output means 4a and the second image signal outputted from the second image information output means 4b are propagated on the image information transmission path 6a and distributed to the individual carts 1 to 3. In each car, the branch means 7a extracts the first and second image signals from the image information transmission path 6a and provides them as input to the image display means 8. The image display means 8 demodulates at least one of the incoming first and second signals and displays the image.

As shown above, the display system of the first preferred embodiment has a plurality of image information output means and each display means receives image information from the plurality of image information output means, so that even if any of the image information output means breaks down, another image information output means can distribute image information; therefore the distribution of image information to the display means is not likely to be disabled.

A coaxial cable can be used as the image information transmission path 6a. The image information contained in the first image signal and the image information contained in the second image signal may be the same or different. The image display means 8 may demodulate and display one of the first and second image signals or may demodulate and display both signals.

Second Preferred Embodiment

In the first preferred embodiment, the two sets of image information output means are mounted in the same car. However, since the two image information output means are therefore placed in similar environments (vibrations etc.), they may break down at nearly the same time. Furthermore, when one train of cars is separated into two trains, the train having no image information output means cannot distribute image information. Accordingly, in a second preferred embodiment, the display system carried on the train has two sets of image information output means separately disposed in different cars.

Figure 2:
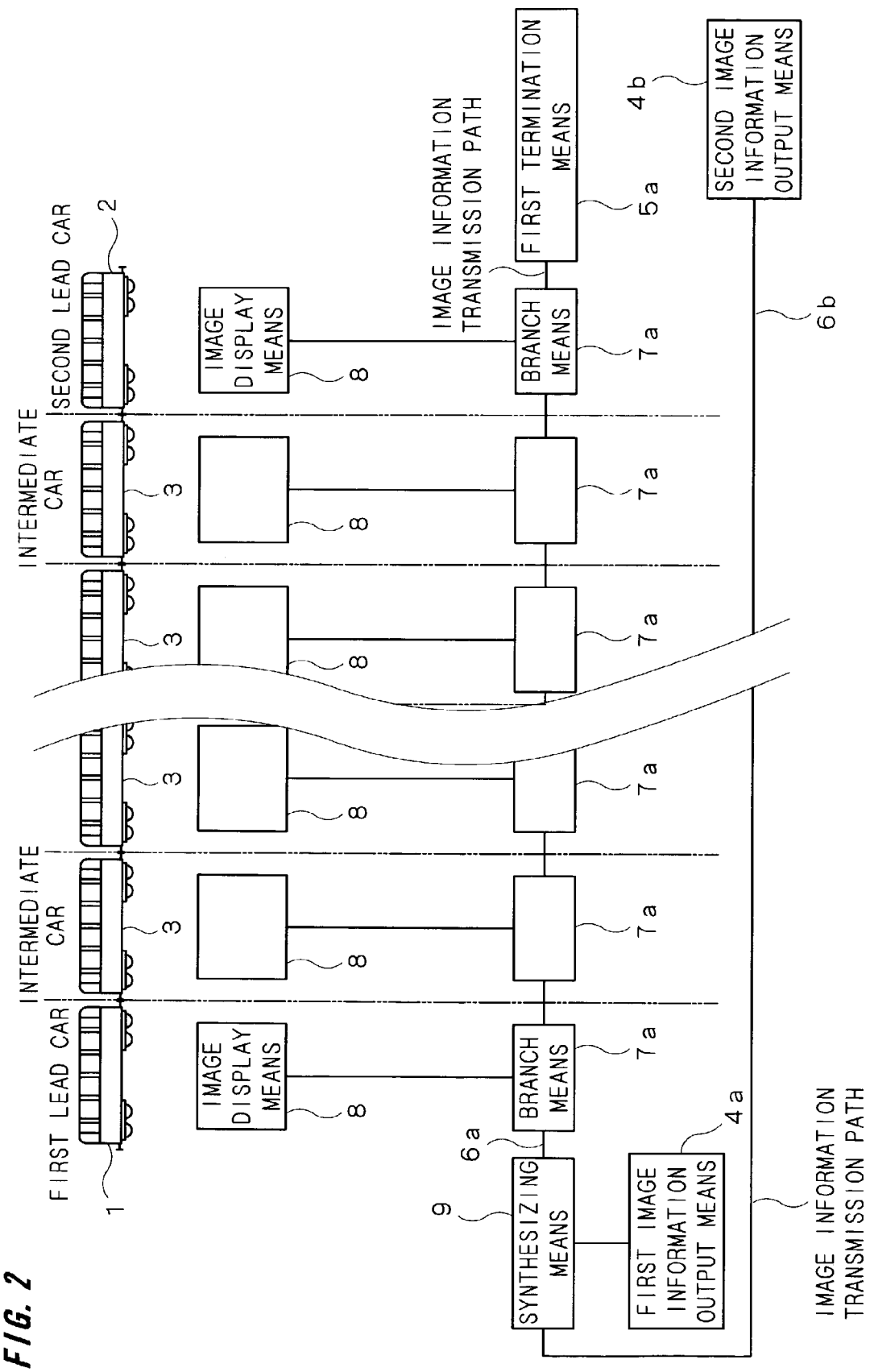
FIG. 2 is a schematic structural diagram that illustrates a display system carried on a train according to a second preferred embodiment.

FIG. 2 is a schematic structural diagram that illustrates a train-borne display system of the second preferred embodiment. In the figure the parts same as or corresponding to those of the conventional system and the system of FIG. 1 are shown at the same reference characters and not described again here. Now, the second image information output means 4b shown in FIG. 1 is mounted in the second lead car 2. Further, in FIG. 2, 6b denotes an image information transmission path which has its one end connected to the second image information output means 4b, passes through the intermediate cars 3, and is connected at its other end to the synthesizing means 9.

Its operation is now described. The first image signal outputted from the first image information output means 4a is inputted to the synthesizing means 9. The second image signal outputted from the second image information output means 4b is inputted to the synthesizing means 9 through the image information transmission path 6b. The synthesizing means 9 outputs the incoming first and second image signals onto the first image information transmission path 6a. In each car, the branch means 7a extracts the first and second image signals from the image information transmission path 6a and inputs them to the image display means 8. The image display means 8 demodulates at least one of the incoming first and second image signals and displays the image.

As shown above, in the train-borne display system of the second preferred embodiment, a plurality of image information output means are separately disposed on different cars, which reduces the possibility that all image information output means will break down at the same time, thus reducing the possibility that the distribution of image information to the display means will be disabled.

The first and second image information output means may be constructed to be operated by the crew, or to automatically detect an accident such as derailment or fire, so as to output image information for urging the passengers to evacuate. In this case, the second preferred embodiment is very effective in ensuring the safety of passengers since the two sets of image information output means are not likely to break down at the same time.

Furthermore, when one train of cars is separated into two trains, the cars can be separated in such a way that each train includes at least one image information output means so that image information can be distributed in both trains.

Third Preferred Embodiment

In the first preferred embodiment, the first lead car and the second lead car are different in the structure of the display system carried on the train. Accordingly the first lead car and the second lead car must be distinguished and differently handled, which restricts the management of the cars. According to a third preferred embodiment, the first lead car and the second lead car are constructed identically in the structure of the display system carried on the train.

Figure 3:
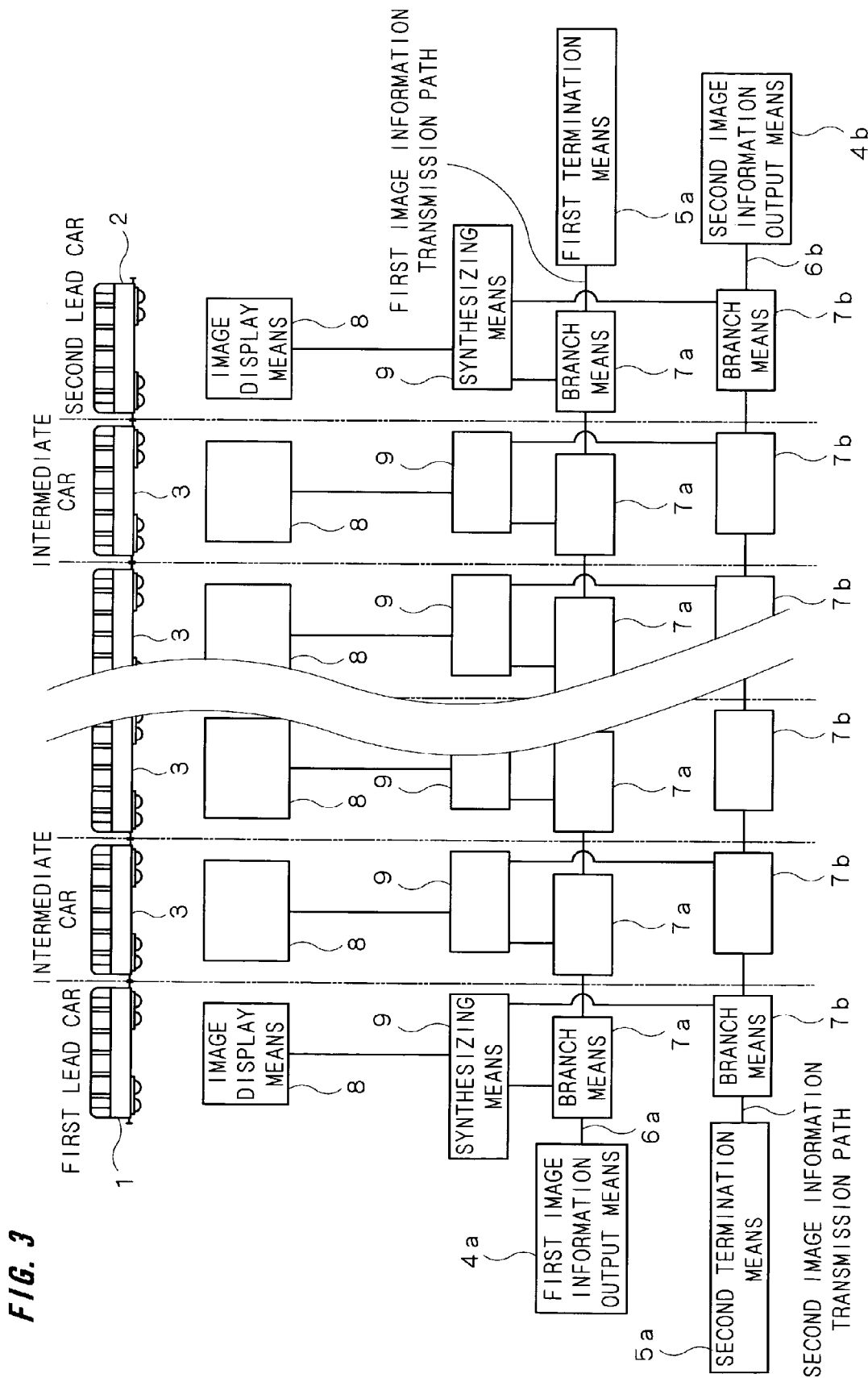
FIG. 3 is a schematic structural diagram that illustrates a display system carried on a train according to a third preferred embodiment.

FIG. 3 is a schematic structural diagram that illustrates a display system carried on a train according to the third preferred embodiment. In the figure the parts same as or corresponding to those in the conventional system and the system of FIG. 1 are shown by the same reference characters and not described again here. The second image information output means 4b shown in FIG. 1 is mounted in the second lead car 2 and both the first and second lead cars are equipped with respective termination means.

In FIG. 3, 5b denotes a second termination means provided in the first lead car 1; 6b denotes an image information transmission path that has its one end connected to the second image information output means 4b, passes through the intermediate cars 3, and has its other end connected to the second termination means 5b; 7b denotes branch means provided in the first lead car 1, the intermediate cars 3, and the second lead car 2 to branch the image information transmission path 6b; and 9 denotes synthesizing means connected to the image information transmission paths 6a and 6b branched by the branch means 7a and 7b, and for providing the first and second image signals on the transmission paths 6a and 6b as output to the image display means 8.

Its operation is now described. The first image signal outputted from the first image information output means 4a is carried on the first image information transmission path 6a and distributed to the cars 1 to 3. In each car, the first branch means 7a extracts the first image signal from the image information transmission path 6a and outputs it to the synthesizing means 9. The second image signal outputted from the second image information output means 4b is carried on the second image information transmission path 6b and distributed to the cars 1 to 3. In each car, the second branch means 7b extracts the second image signal from the image information transmission path 6b and outputs it to the synthesizing means 9. The synthesizing means 9 outputs to the image display means 8 the first and second image signals coming from the first and second branch means 7a and 7b. The image display means 8 demodulates at least one of the input first and second image signals and displays the image.

As shown above, in the third preferred embodiment, the first lead car and the second lead car are the same in the structure of the display system carried on the train, which lightens the restriction on the management of the cars.

That is to say, in the display system carried on the train shown in FIG. 1, the first lead car is equipped with the image information output means, while the second lead car is equipped with the termination means; thus the first and second lead cars are constructed in different ways and must be distinguished in organizing trains. On the other hand, the train-borne display system shown in FIG. 3 has an image information output means, a first image information transmission path for transmitting the output from that image information output means, a second image information transmission path connected to another image information output means provided in another car, and a termination resistor for terminating the second image information transmission path; thus the first lead car and the second lead car have the same structure and the trains can be organized without the need to distinguish the first lead car and the second lead car.

Fourth Preferred Embodiment

The first to third preferred embodiments have described display systems carried on the train in which each display means receives image signals from a plurality of image information output means. A fourth preferred embodiment shows an example of a channel switching method in the image display means shown in the first to third preferred embodiments.

FIG. 4 is an explanation diagram that illustrates a channel switching method of the fourth preferred embodiment. In the figure, the parts same as or corresponding to those shown in FIGS. 1 to 3 are indicated by the same reference characters are not described here. FIG. 4(a) is a schematic diagram illustrating the structure of the first and second image information output means 4a and 4b shown in FIGS. 1 to 3. In the figure, 41 denotes image information recording means in which image information is previously recorded, 42 denotes image information reading means for reading the image information from the image information recording means 41 and outputting the image information as an image signal, and 43 denotes modulating means for modulating the image signal outputted from the image information reading means 42 and outputting the image signal onto the first or second channel.

FIG. 4(b) is a schematic diagram illustrating the structure of the image display means 8 shown in FIGS. 1 to 3. In the figure, 81 denotes demodulating means for demodulating a given channel of the input signal, 82 denotes image information detecting means for detecting whether the demodulated signal contains image information, 83 denotes channel switch means for switching the channel to be demodulated by the demodulating means 81 when the image information detecting means 82 has detected absence of image information, and 84 denotes a display screen for displaying the image contained in the demodulated signal.

Its operation is now described. First, the first and second image signals outputted from the first and second image information output means 4a and 4b shown in FIGS. 1 to 3 are respectively carried on the first and second channels and provided to the image display means 8 shown in FIG. 4(b). In the image display means 8, the demodulating means 81 demodulates the first channel, for example, and the image contained in the first image signal is displayed on the display screen 84.

Now, suppose that the first image information output means 4a broke down and the output of the first image signal halted. Then the image information detecting means of FIG. 4(b) detects the absence of image information in the output signal from the demodulating means 81 and the channel switch means 83 receives the detected result and switches the target to be demodulated by the demodulating means 81 from the first channel to the second channel.

While the image information output means 4a and 4b have the image information recording means 41 and the image information reading means 42 in this example, they may contain radio wave receiving means (not shown) that receives an image signal sent through radio wave and outputs the image signal to the modulating means 43, or may contain transmitted signal receiving means (not shown) that receives an image signal sent through a transmission line provided in parallel with the railroad track of the train and outputs the image signal to the modulating means 43.

Separately disposing the image information output means 4a and 4b in different cars is especially effective when the image information recording means 41 is one that is constructed to be mechanically driven for the reading of the recorded information, e.g. a hard disk head or an optical disk pick-up, since such image information recording means 41 are more likely to break down due to vibrations.

Fifth Preferred Embodiment

In the fourth preferred embodiment, the image display means detects the absence of image information in the first channel and switches the display channel from the first channel to the second channel. In a fifth preferred embodiment, fault detecting means is provided to detect fault of the image information output means and the channel displayed by the image display means is switched in accordance with the detected result.

Figure 5:
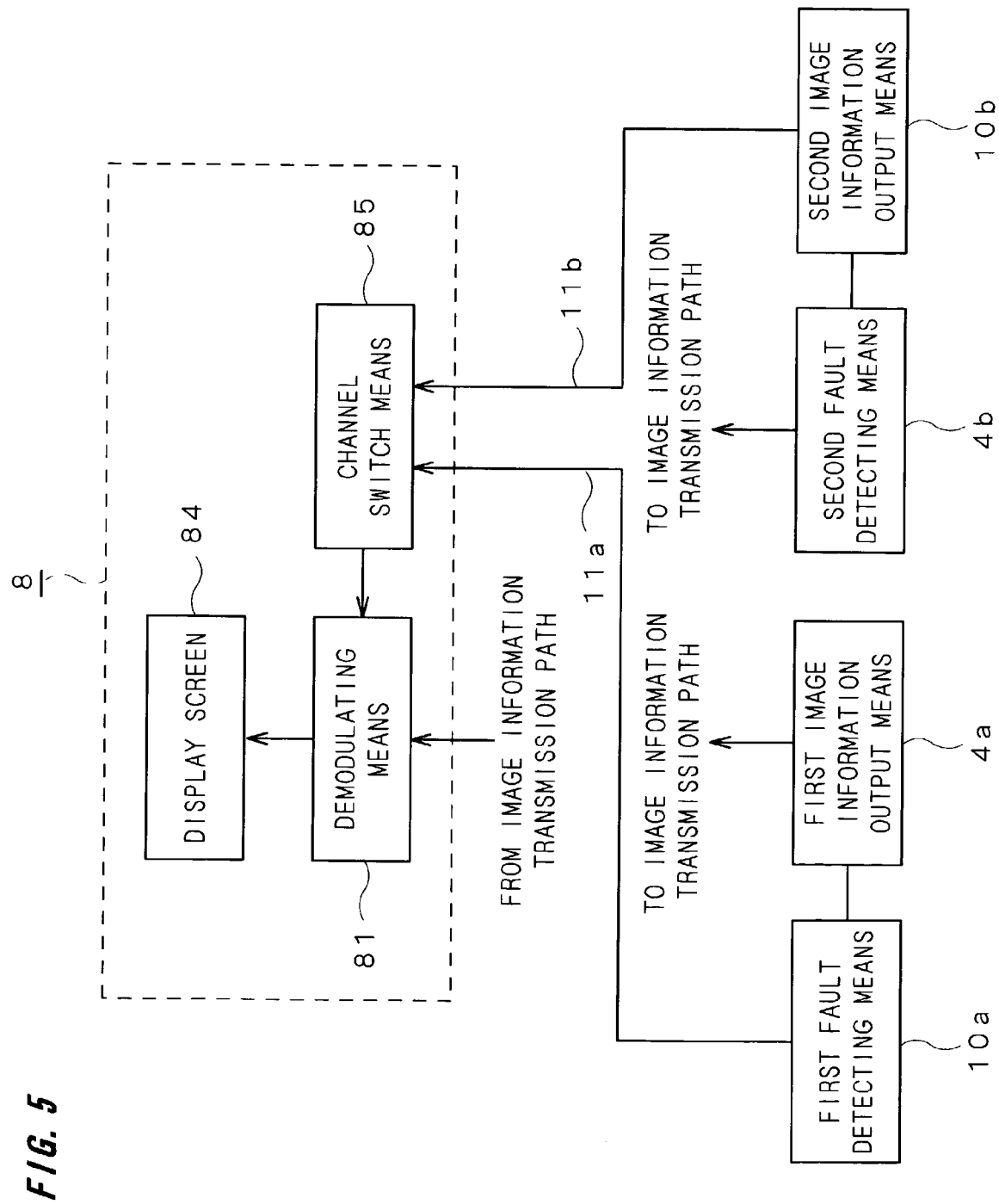
FIG. 5 is a schematic structural diagram that illustrates a channel switching method according to a fifth preferred embodiment.

FIG. 5 is a schematic structural diagram that illustrates a channel switching method of the fifth preferred embodiment. In the figure, the parts same as or corresponding to those shown in FIGS. 1 to 4 are indicated by the same reference characters and not described again here. In the figure, 10a denotes first fault detecting means for detecting fault of the image information output means 4a and 10b denotes second fault detecting means for detecting fault of the image information output means 4b, where the first fault detecting means is provided in the same car as the first image information output means 4a and the second fault detecting means is provided in the same car as the second image output means. The results detected by the first and second fault detecting means are transmitted to the channel switch means 85 in the image display means 8 through the transmission paths 11a and 11b. The channel switch means 85 receives the detected results and switches the channel to be demodulated by the demodulating means 81.

Its operation is now described. First, the first and second image signals outputted from the first and second image information output means 4a and 4b are respectively carried on the first and second channels and inputted to the image display means 8. In the image display means 8, the demodulating means 81 demodulates, for example, the first channel, and displays the image contained in the first image signal on the display screen 84.

Now suppose that the first image information output means 4a broke down and the output of the first image signal halted. Then the first fault detecting means 10a detects the fault of the first image information output means 4a and informs the channel switch means 85 of the detected result. On receiving the detected result, the channel switch means 85 switches the target demodulated by the demodulating means 81 from the first channel to the second channel.

Sixth Preferred Embodiment

In the train-borne display systems according to the second and third preferred embodiments, a plurality of image information output means are separately disposed in different cars. Then, as already described, when one train of connected cars is separated into two trains, the cars are separated in such a way that each train contains at least one image information output means so that the image information can be distributed in both trains of cars. A sixth preferred embodiment shows an example of the train separating method.

Figure 6:
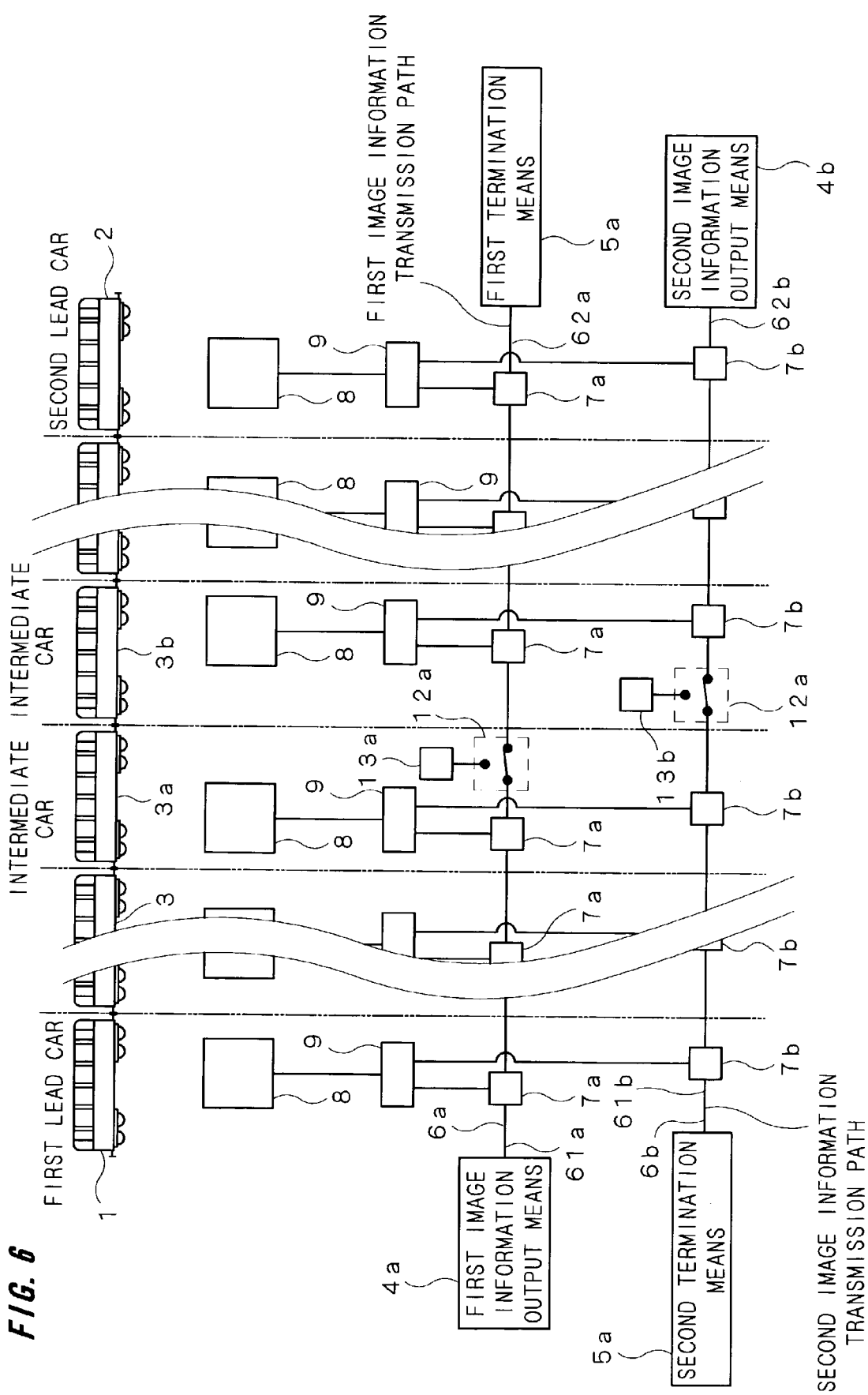
FIG. 6 is a schematic structural diagram that illustrates a display system carried on a train according to a sixth preferred embodiment.

FIG. 6 is a schematic structural diagram that illustrates a display system carried on a train according to the sixth preferred embodiment. In the figure the parts same as or corresponding to those shown in FIG. 3 are indicated by the same reference characters and not described again here. In FIG. 6, 3a and 3b denote adjacent intermediate cars; 12a and 12b denote switch means; and 13a and 13b denote termination means. The switch means 12a and the termination means 13a are mounted in the intermediate car 3a and the switch means 12b and the termination means 13b are mounted in the intermediate car 3*b*. The switch means 12*a* separates the first image information transmission path 6*a* into a transmission path 61*a* connected to the first image information output means 4*a* and a transmission path 62*a* connected to the termination means 5*a* and switchably connects the transmission path 61*a* to the transmission path 62*a* and to the termination means 13*a*. Similarly, the switch means 12*b* separates the second image information transmission path 6*b* into a transmission path 62*b* connected to the second image information output means 4*b* and a transmission path 61*b* connected to the termination means 5*b* and switchably connects the transmission path 61*b* to the transmission path 62*b* and to the termination means 13*b*.

Figure 7:
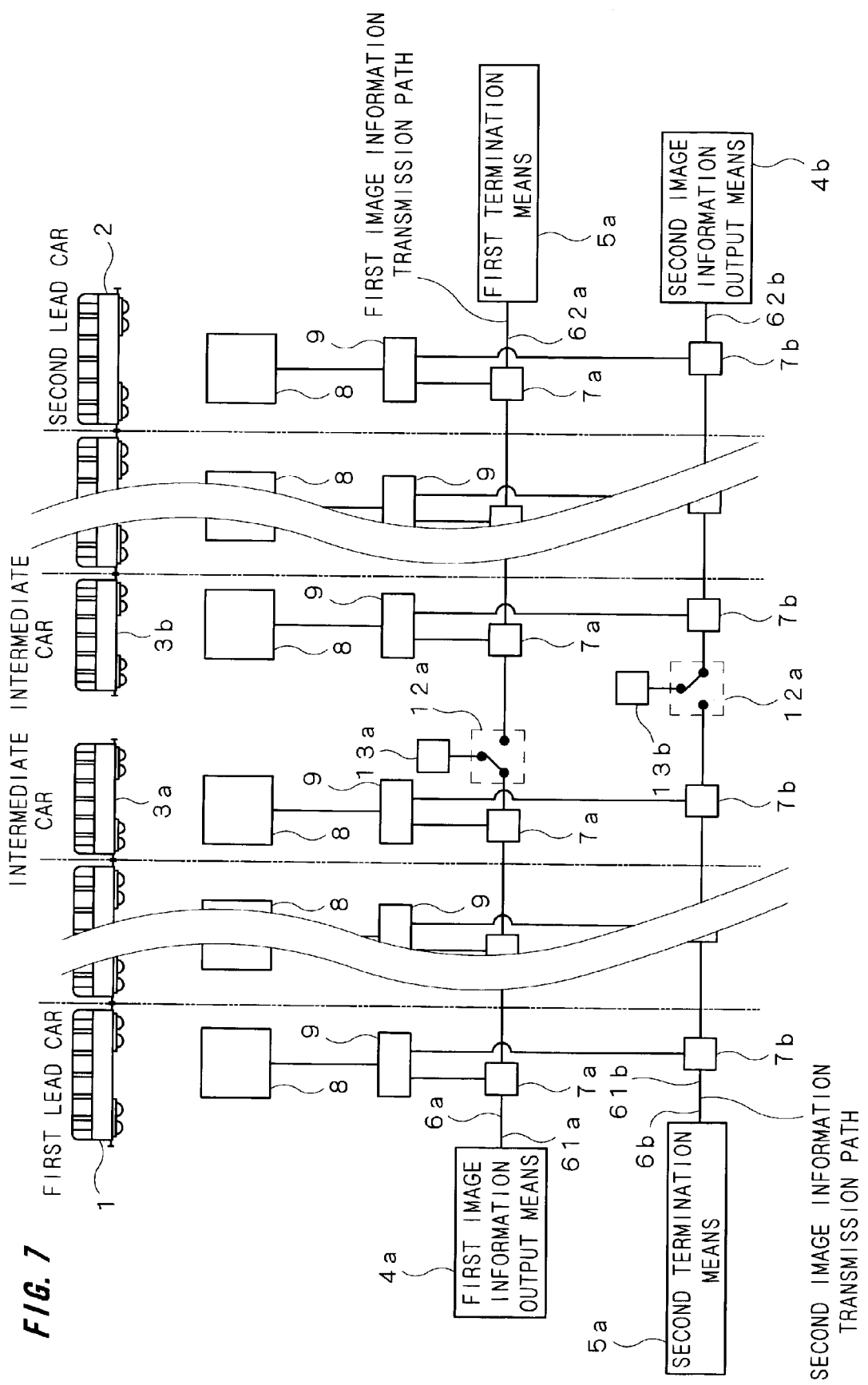
FIG. 7 is a schematic structural diagram that illustrates the train of FIG. 6 that has been separated into two.

FIG. 7 illustrates the train of FIG. 6 that has been separated into two trains. In FIG. 7 the parts same as or corresponding to those shown in FIG. 6 are indicated by the same reference characters and not described here again. In this figure the cars 3*a* and 3*b* are separated, with the switch means 12*a* connecting the transmission path 61*a* and the termination means 13*a* and the switch means 12*b* connecting the transmission path 62*b* and the termination means 13*b*.

FIG. 7 illustrates the train of FIG. 6 that has been separated into two trains. In FIG. 7 the parts same as or corresponding to those shown in FIG. 6 are indicated by the same reference characters and not described here again. In this figure the cars 3*a* and 3*b* are separated, with the switch means 12*a* connecting the transmission path 61*a* and the termination means 13*a* and the switch means 13*b* connecting the transmission path 61*b* and the termination means 13*b*.

Its operation is now described. The first image signal outputted from the first image information output means 4*a* is propagated on the transmission path 61*a* and distributed to the cars from the first lead car 1 to the intermediate car 3*a*. In the first lead car 1, the intermediate car 3*a,* and the intermediate cars between them, the branch means 7*a* provided on the transmission path 61*a* extracts the first image signal from the transmission path 61*a* and outputs the first image signal to the image display means 8 through the synthesizing means 9.

On the other hand, the second image signal outputted from the second image information output means 4*b* is propagated on the transmission path 62*b* and distributed to the cars from the second lead car 2 to the intermediate car 3*b*. In the second lead car 2, the intermediate car 3*b,* and the intermediate cars 3 between them, the branch means 7*b* provided on the transmission path 62*b* extracts the second image signal from the transmission path 62*b* and outputs the second image signal to the image display means 8 through the synthesizing means 9.

Figure 8:
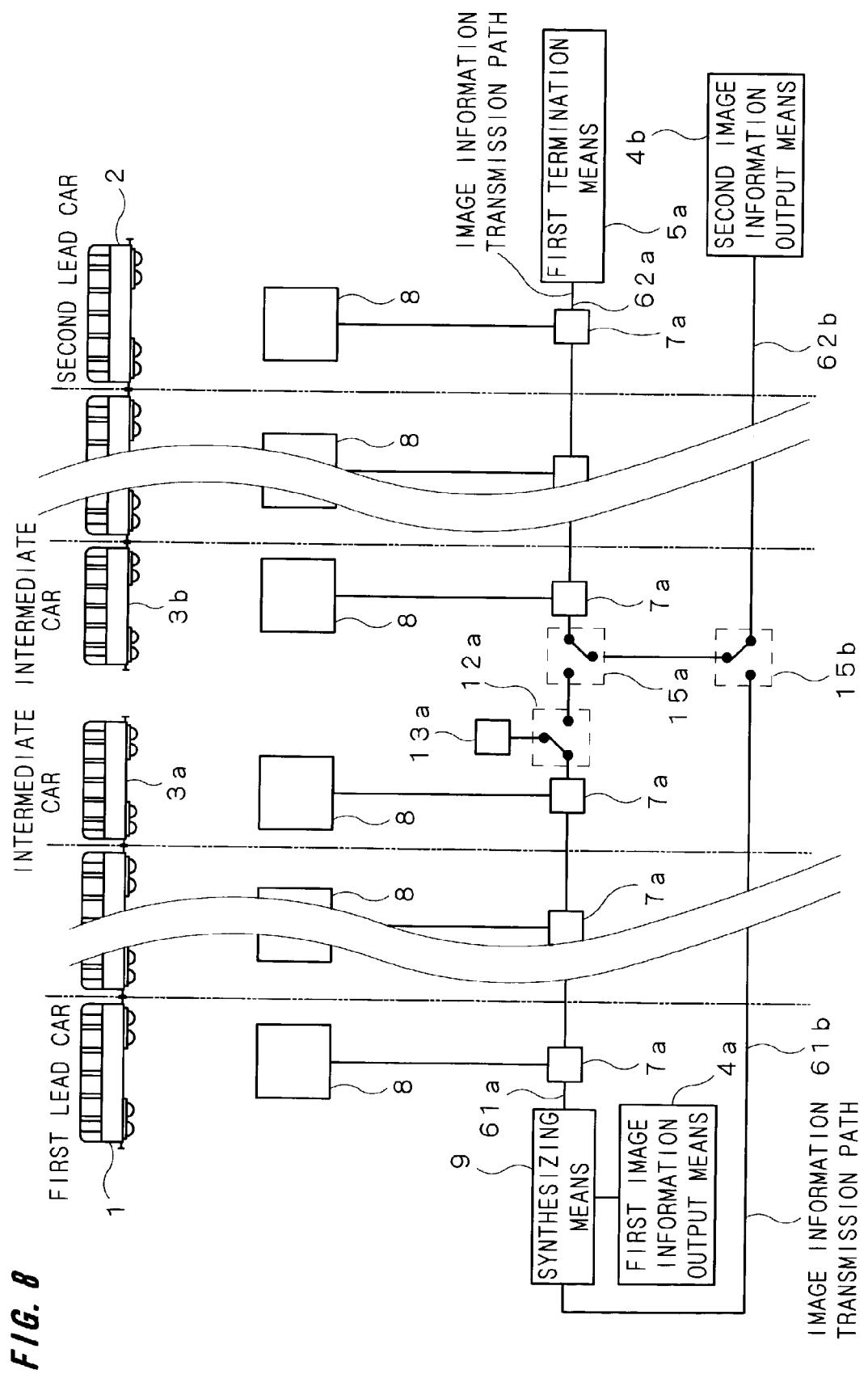
FIG. 8 is a schematic structural diagram that illustrates another display system carried on a train according to the sixth preferred embodiment.

While the method for separating one train into two trains has been described in the train-borne display system shown in FIG. 3, the separation of one train into two can be similarly achieved by the method shown in FIG. 8 in the train-borne display system shown in FIG. 2. In FIG. 8, the parts same as or corresponding to those shown in FIGS. 2 and 7 are indicated by the same reference characters and not described again here. In FIG. 8, in order to separate the train into two, the transmission path 61*a* is connected to the termination means 13*a* and the transmission path 62*a* and the transmission path 62*b* are connected through the switches 15*a* and 15*b*.

As shown above, in the sixth preferred embodiment, termination means is provided in a given car and switch means is provided in that given car to switchably connect the image information transmission path connected to the image information output means to that termination means and to termination means provided in another car, so that the image information transmission path can be terminated even when the train is separated into two trains, making it possible to distribute image of good quality to each car. Needless to say, the termination means and the switch means can be provided in all cars of the train.

Seventh Preferred Embodiment

In a seventh preferred embodiment, separation detecting means is provided to detect the separation of cars and this detecting means controls the switch means shown in the sixth preferred embodiment.

Figure 9:
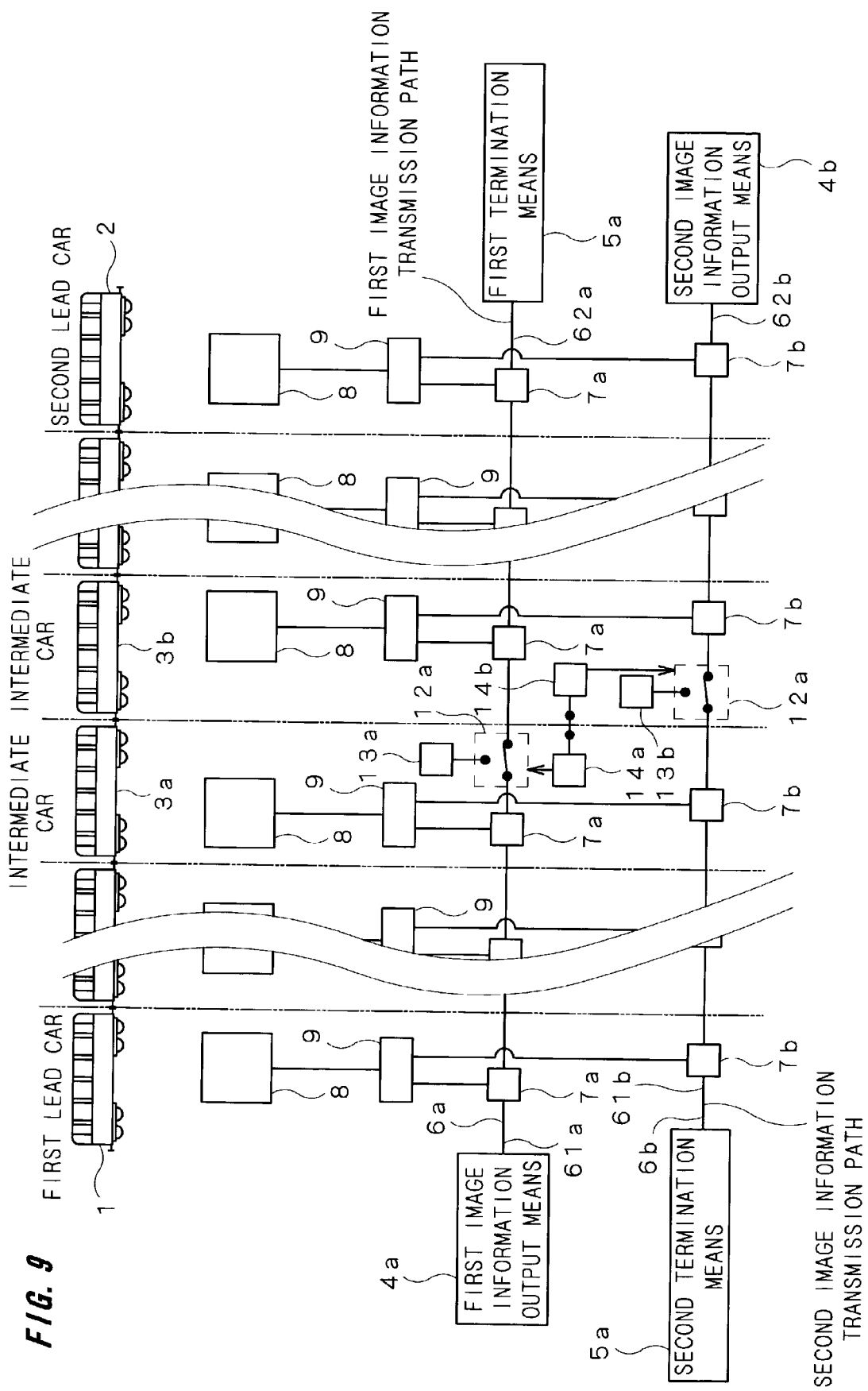
FIG. 9 is a schematic structural diagram that illustrates a display system carried on a train according to a seventh preferred embodiment.

FIG. 9 is a schematic structural diagram that illustrates a display system carried on a train according to a seventh preferred embodiment. In the figure, the parts same as or corresponding to those shown in FIGS. 6 and 7 are indicated by the same reference characters and not described here again. In FIG. 9, 14*a* and 14*b* denote separation detecting means for detecting the separation of cars. The separation detecting means 14*a* and 14*b* send respective identification signals to each other so that they can recognize that the intermediate car 3*a* and the intermediate car 3*b* are coupled together.

Figure 10:
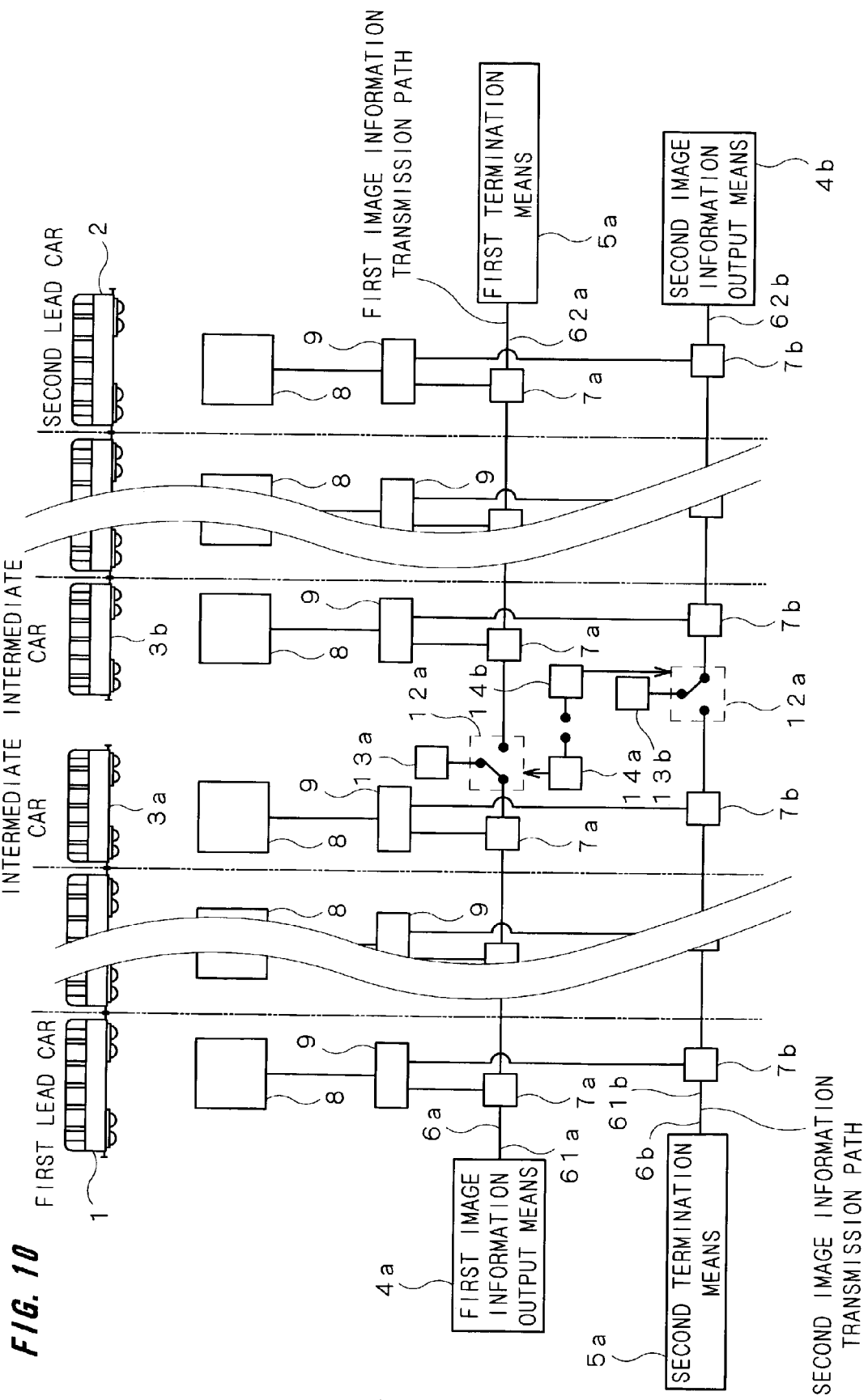
FIG. 10 is a schematic structural diagram that illustrates the train shown in FIG. 9 that has been separated.
Figure 11:
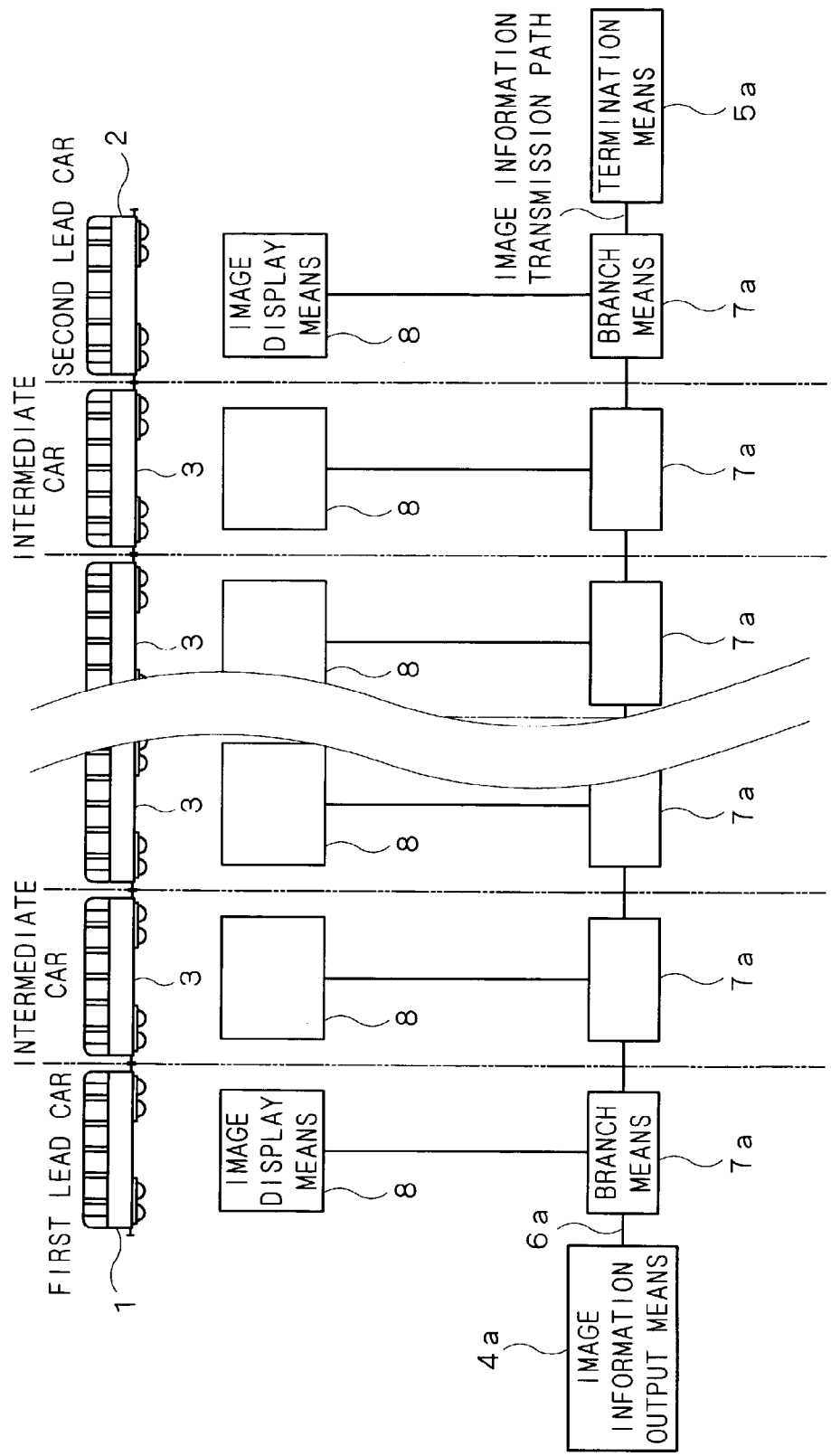
FIG. 11 is a schematic structural diagram that illustrates a conventional display system carried on a train.

FIG. 10 shows the train of FIG. 9 which has been separated apart. At this time, the separation detecting means 14*a* detects the absence of signal reception from the separation detecting means 14*b* and detects that the intermediate car 3*a* and the intermediate car 3*b* have been separated apart. Then it controls the switch means 12*a* to connect the transmission path 61*a* to the termination means 13*a*. In the same way, the separation detecting means 14*b* detects the absence of signal reception from the separation detecting means 14*a* and controls the switch means 12*b* to connect the transmission path 62*b* to the termination means 13*b*.

As shown above, in the seventh preferred embodiment, the separation detecting means for detecting the separation of cars controls the switching to the termination means described in the sixth preferred embodiment. Needless to say, the same separation detecting means can be provided in the train-borne display system shown in FIG. 8.

What is claimed is:

1. A display system to be carried on a railroad train, comprising:

first image information output means provided in a given car in a train of a plurality of connected cars, for outputting first image information;

second image information output means provided in a given car of said train, for outputting second image information;

display means provided in a given car of said train, for switchably displaying said first image information transmitted from said first image information output means and said second image information transmitted from said second image information output means;

first termination means provided in the car in which said second image information output means is provided;

second termination means provided in the car in which said first image information output means is provided;

a first image information transmission path having its one end connected to said first image information output means and its other end connected to said first termination means;

a second image information transmission path having its one end connected to said second image information output means and its other end connected to said second termination means;

first branch means for extracting from said first image information transmission path said first image information outputted from said first image information output means and outputting said first image information to said display means; and second branch means for extracting from said second image information transmission path said second image information outputted from said second image information output means and outputting said second image information to said display means, wherein said first image information output means and said second image information output means are provided in different cars of said train.

2. A display system to be carried on a railroad train, comprising:

first image information output means provided in a given car in a train of a plurality of connected cars, for outputting first image information;

second image information output means provided in a given car of said train, for outputting second image information;

display means provided in a given car of said train, for switchably displaying said first image information transmitted from said first image information output means and said second image information transmitted from said second image information output means;

first termination means provided in the car in which said second image information output means is provided;

an image information transmission path having its one end connected to said first image information output means and its other end connected to said first termination means;

second termination means provided in a car coupled between the car in which said first image information output means is provided and the car in which said second image information output means is provided; and switching means provided in said car in which said second termination means is provided, for switchably connecting said image information transmission path to said first termination means and to said second termination means, wherein said first image information output means and said second image information output means are provided in different cars of said train.

3. The display system carried on a railroad train according to claim 2, which comprises:

means for detecting that a car coupled to said car in which said second termination means is provided has been separated therefrom; and control means for controlling the switching by said switching means in accordance with a result of the detection.

* * * * *